Feb. 9, 1960
T. O. JONES
2,924,014
DISTANCE MEASURING DEVICE
Filed June 28, 1957
2 Sheets-Sheet 1
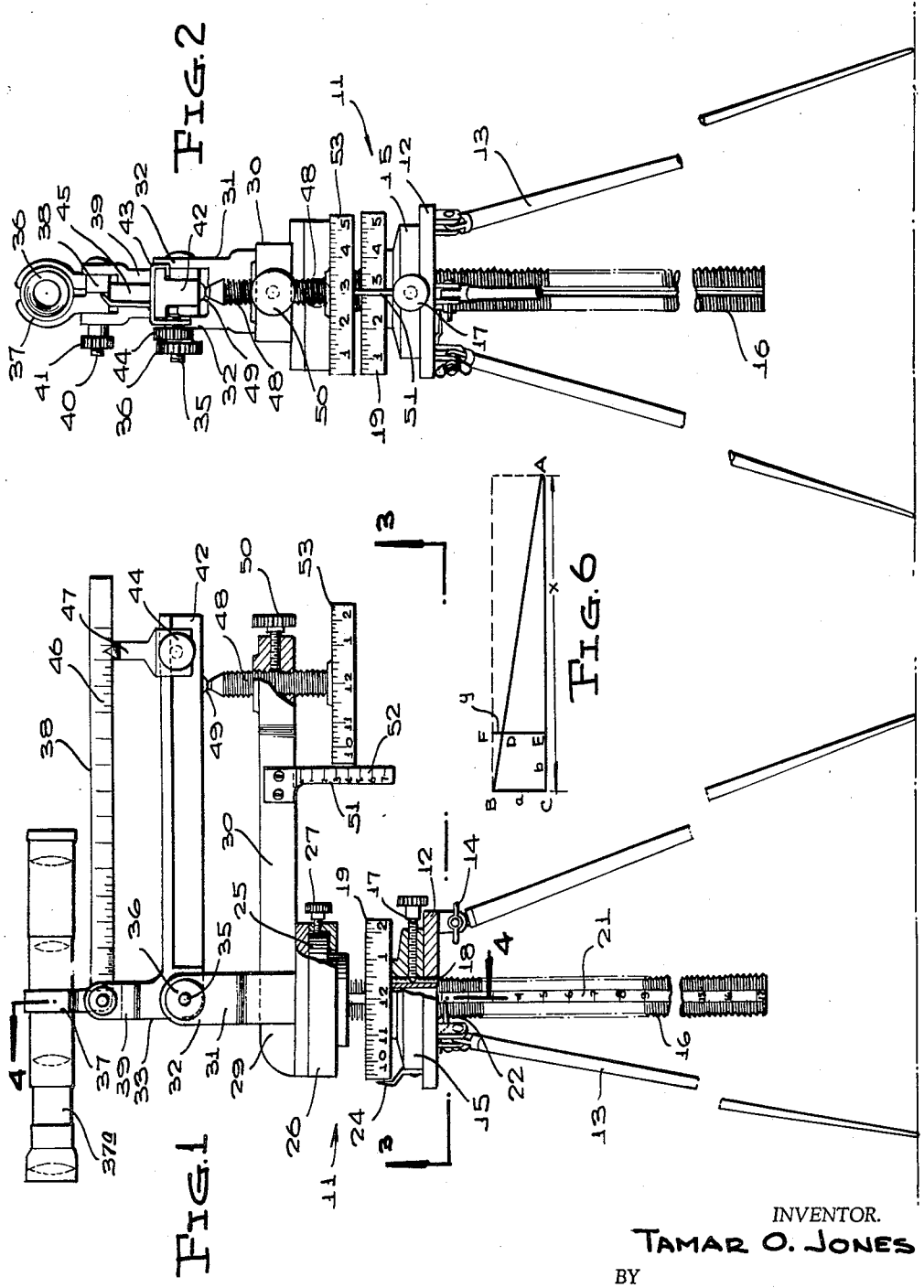
INVENTOR.
TAMAR O. JONES
BY
McMorrow, Berman & Davidson
ATTORNEYS Feb. 9, 1960     T. O. JONES     2,924,014
DISTANCE MEASURING DEVICE Filed June 28, 1957     2 Sheets—Sheet 2

INVENTOR.
TAMAR O. JONES
BY
McMorrow, Berman & Davidson
ATTORNEYS

United States Patent Office 2,924,014
Patented Feb. 9, 1960

2,924,014

DISTANCE MEASURING DEVICE

Tamar O. Jones, Booneville, Miss.

Application June 28, 1957, Serial No. 668,670

1 Claim. (Cl. 33—71)

This invention relates to surveying instruments, and more particularly to a distance measuring instrument.

A main object of the invention is to provide a novel and improved distance measuring instrument which is simple in construction, which is easy to operate, and which provides highly accurate measurements of relatively large distances, and which is arranged so that it may be readily adjusted to provide accurate measurements of shorter distances.

A further object of the invention is to provide an improved distance measuring instrument operating on the principle of triangulation, the instrument involving inexpensive parts, being durable in construction, and enabling the distance to a selected point to be rapidly and accurately measured with a minimum amount of manipulation of the instrument and with the use of relatively simple computations.

Further objects and advantages of the invention will become apparent from the following description and claim, and from the accompanying drawings, wherein:

Figure 1 is a side elevational view, partly in vertical cross section, of an improved distance measuring instrument constructed in accordance with the present invention.

Figure 2 is a front elevational view of the distance measuring instrument of Figure 1.

Figure 6 is a diagram illustrating the principle of operation of the distance measuring instrument of Figures 1 to 5.

Figure 3:
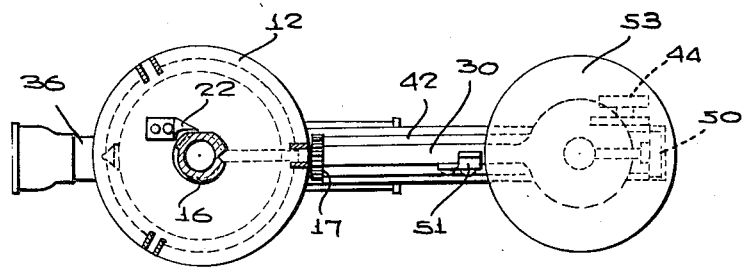
Figure 3 is a horizontal cross sectional view taken on the line 3—3 of Figure 1.
Figure 4:
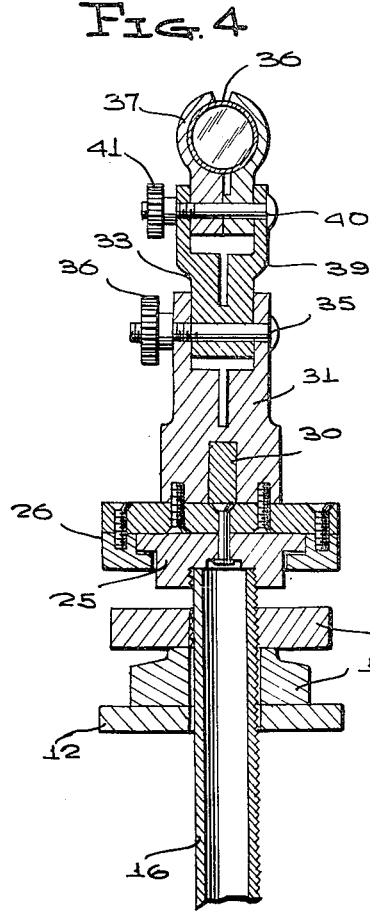
Figure 4 is an enlarged vertical cross sectional view taken on the line 4—4 of Figure 1.
Figure 5:
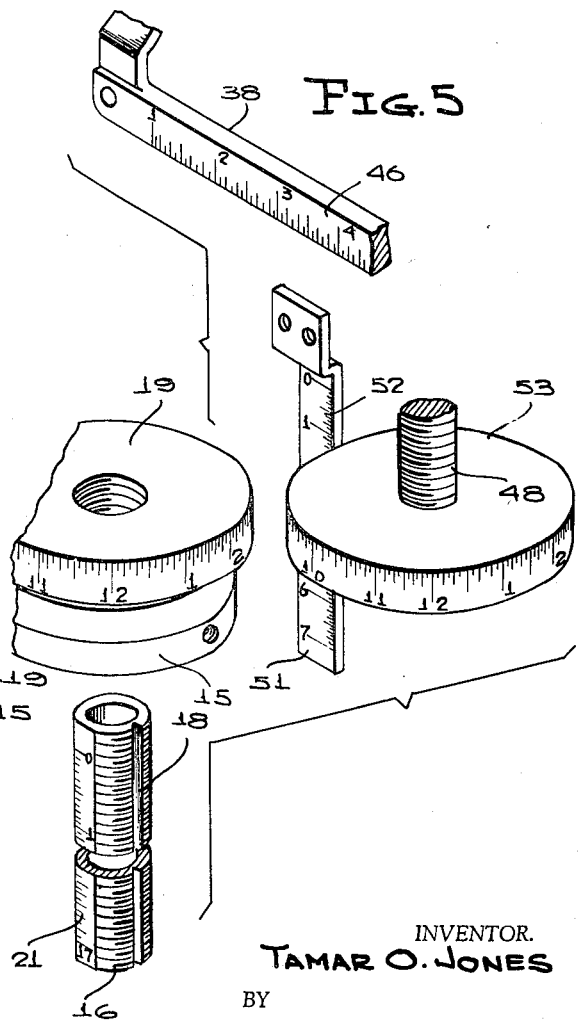
Figure 5 is a fragmentary perspective view showing portions of the instrument of Figure 1 in separated positions.

Referring to the drawings, the improved distance measuring instrument is designated generally at 11 and comprises a horizontal support 12 provided with the pivoted tripod legs 13 which may be arranged to support the support 12 in a horizontal position and which may be clamped thereto, as by the conventional wing nuts 14.

Rigidly secured on the support 12 is the annular collar member 15, and extending loosely and axially through the collar member 15 and the support element 12 is the vertical elevating screw or shank 16.

Designated at 17 is a horizontal clamping screw which is threadedly engaged in the collar member 15 and which is engageable in a vertical groove 18 formed in the elevating screw 16 so that the elevating screw may be rigidly clamped to the collar member 15 and support 12 when the clamping screw 17 is tightened.

Threadedly engaged on the elevating screw 16 is the circular micrometer nut member 19, said nut member bearing on the top surface of the collar member 15 and supporting the elevating screw or depending shank 16 on said collar member when the clamping screw 17 is in a released position. However, the end of the clamping screw 17 is engageable in the groove 18 of the elevating screw so that the elevating screw is held against rotation and so that the elevating screw may be moved vertically responsive to the rotation of the micrometer nut member 19.

The elevating screw 16 is provided with a vertical scale 21 calibrated in suitable units, for example, calibrated in inches, and the support 12 is provided with a stationary horizontal pointer finger 22 extending adjacent the scale 21, enabling the scale values of the elevating screw 16 to be easily read. An upstanding pointer finger 24 is secured to the periphery of the collar member 15, said finger 24 extending adjacent the periphery of the micrometer nut 19, the micrometer nut being calibrated in subdivisions of the units of scale 21. For example, the micrometer nut 19 may be provided on its periphery with a scale graduated into twelve divisions, each division being further graduated into twelve parts. The elevating screw 16 may be provided with threads spaced, for example, such that there are twelve threads per inch, whereby a complete revolution of the micrometer nut member 19 moves the screw vertically $\frac{1}{12}$ of an inch. Thus, each scale division on the micrometer nut member 19 represents a change in elevation of screw 16 of $\frac{1}{1728}''$.

Rigidly secured to the top end of the screw 16 is the flanged head 25, and swivelly engaged thereon is a circular housing member 26 which is provided with a horizontally extending clamping screw 27 engageable with the periphery of the head 25 so as to rigidly clamp the housing member 26 thereto when the screw 27 is tightened. Thus, when the screw 27 is released, the housing member 26 may swivel on the head 25.

Rigidly secured to the housing member 26 is the bracket member 29 comprising a horizontally extending bar portion 30 and a vertical upwardly extending pivot yoke 31. Received between the vertical upstanding fingers 32, 32 of the pivot yoke 31 is the rightangled corner portion of an auxiliary bracket member 33, said auxiliary bracket member 33 being pivotally connected to the fingers 32, 32 by a transverse pivot bolt 35 provided with a clamping nut 36, which when tightened, locks the auxiliary member 33 rigidly to the fingers 32, 32.

Designated at 37a is a sighting telescope which is mounted in a bracket 37 secured to the end of a telescope supporting bar 38, said bar 38 being pivotally connected at its end to the upstanding yoke member 39 of auxiliary bracket 33 by a transverse pivot bolt 40 provided with a clamping nut 41, which when tightened, rigidly secures the telescope supporting bar 38 in the yoke portion 39 of auxiliary bracket member 33.

The auxiliary bracket member 33 comprises the generally horizontally extending, T-shaped track bar 42 on which is slidably mounted a carriage member 43, said carriage member being formed to embrace the head portion of the bar 42 in the manner clearly illustrated in Figure 2, whereby the carriage member is retained on the T-shaped track bar 42 for sliding adjustment therealong. A clamping screw 44 is provided on one side wall of the carriage member 43, said clamping screw being engageable with the web portion of the T-shaped track bar 42 to rigidly secure the carriage member 43 in adjusted position on the track bar 42. The carriage member 43 is provided with the upwardly projecting abutment element 45 which cammingly engages the bottom surface of the telescope supporting bar 38, the abutment member 45 being of sufficient height so that the telescope supporting bar 38 is non-parallel with respect to the head portion of the track bar 42, whereby the angle between the telescope supporting bar 38 and the track bar 42 may be varied by adjusting the carriage member 43. The telescope supporting bar 38 is provided with a suitable reference scale 46 and the carriage member 43 is provided with a suitable index pointer 47 extending adjacent the reference scale 46, whereby the carriage member 43 may be locked at a predetermined designated position along the telescope bar reference scale 46, and whereby this position may be easily duplicated whenever necessary.

Threadedly engaged through the bracket arm 30 is a further elevating screw 48, said elevating screw being disposed directly beneath the outer end portion of the bracket member 42 and being located at a definitely known distance from the axis of the main elevating screw 16, for example, a distance of 12 inches. The auxiliary elevating screw 48 engages an abutment lug 49 depending from the bottom surface of the track member 42, as shown in Figures 1 and 2, whereby the auxiliary bracket member 33 may be rotated around the transverse pivot bolt 35 responsive to rotation of the auxiliary elevating screw 48. A clamping screw 50 is provided in the end of the bracket arm 30, said clamping screw being engageable with the elevating screw 48 to rigidly lock said elevating screw when the clamping screw 50 is tightened.

Secured to the arm 30 and depending vertically therefrom is a scale bar 51 provided with an inch scale 52. The lower end of the screw 48 is provided with the circular micrometer head 53 which is disposed adjacent the scale bar 51, whereby the values on the scale bar may be read by observing the position of a designated horizontal element of the micrometer head 53 with respect to the scale 52. Thus, the upper surface of the micrometer head 53 may be utilized as an index means for reading scale 52.

The micrometer head 53 is provided on its periphery with a micrometer scale similar to that provided on the micrometer nut member 19, namely, a scale comprising twelve main divisions, which are further divided into twelve subdivisions, the threads on the screw 48 being similar in pitch to the threads on the screw 16, whereby each subdivision of the micrometer head 53 has the same significance, with respect to vertical movement of screw 48, relative to scale 52, as the corresponding subdivision on the micrometer nut member 19. Figure 6 diagrammatically illustrates the principle of operation of the instrument. Thus, assuming the axis of the elevating screw 16 to be located along the vertical line BC, and the distance $x$ to point A to be measured, the telescope 36 is first sighted on the point A from the point C. This is done by releasing the clamping screw 27 to allow the telescope to swivel horizontally, and by releasing the clamping screw 17 to allow the telescope to be adjusted vertically by means of the micrometer nut 19. Further provision for adjustment of the telescope is available by releasing the clamping nut 50 to allow the track bar 42 to be lowered and by releasing the clamping screw 44 to allow the telescope supporting bar 46 to be angularly adjusted relative to the auxiliary bracket member 33.

When the telescope has been sighted on the distant point A, the respective clamping elements are tightened to establish the reference position of the telescope and to establish the line CA of Figure 6. At this time the position of the elevating screw 16 is read by means of scale 21 and micrometer nut 19.

Clamping screw 17 is then loosened and the micrometer nut member 19 is rotated to elevate the screw 16 by a predetermined amount, for example, by a distance of 1 foot, as determined from the scale 21 on screw 16 and the scale on the periphery of micrometer nut 19. This establishes the value of the vertical arm BC, or the quantity $a$ in Figure 6. Clamping screw 17 is tightened when the telescope 36 has been elevated to the position B in Figure 6. At this time a reading is made of the position of the auxiliary elevating screw 48, by means of scale 52 and the micrometer screw head 53, establishing the point F in Figure 6. As will be seen from Figure 6, the point F is spaced the same distance from the line BC as the point E, the distance CE, designated by the value of $b$, representing the distance of the axis of the auxiliary elevating screw 48 from the axis of the main elevating screw 16. This is preferably of unit value, namely, 1 foot, as in the case of the value $a$.

Clamping screw 50 is then released and the micrometer head 53 is rotated to allow track bar 42 to descend, the clamping nut 36 being loosened to allow such descent, the rotation of the micrometer head 53 being continued until the point A is again sighted in telescope 36. At this time the screw 50 is again tightened and another reading is made of the position of the auxiliary elevating screw 48, establishing the point D in Figure 6, and allowing the value $y$ to be computed from the difference between the first and second readings of the position of auxiliary screw 48. Thus, since the scale 51 increases downwardly, the value $y$ will be the difference between the second reading and the first reading of the position of the auxiliary screw 48.

By simple geometrical proportion it can be shown that $$\frac{x}{a} = \frac{x-b}{a-y}$$

and $$ab = xy$$

Therefore, $$x = \frac{ab}{y}$$

However, $$a = 1 \text{ foot}$$
$$b = 1 \text{ foot}$$

Therefore, $$x = \frac{1}{y} \text{ in feet}$$

From the foregoing explanation it will be seen that the distance, namely, the value $x$ in Figure 6 is equal to the reciprocal of the distance $y$, expressed in feet. Therefore, to obtain the distance to any point, the above procedure is followed and the value $y$ is obtained by determining the difference in readings of the position of the auxiliary adjusting screw 48 between its first and second positions, as above described. The distance to the object will be the reciprocal of this difference, expressed in feet.

Obviously, the instrument can be made employing a different value of the distance $b$ of auxiliary elevating screw 48 from main elevating screw 16, and other values of the vertical distance $a$ may be employed, within the spirit of the present invention.

As an alternative mode of operation of the instrument, the telescope may be first sighted on the distant point A to establish the line CA, after which the micrometer head 53 may be rotated to lower the line of sight from line CA by a definite amount, for example, by an amount corresponding to the line FD in Figure 6. Micrometer nut 19 may then be actuated to elevate the telescope until the target A is again sighted, namely, by an amount corresponding to the line BC in Figure 6, giving the construction shown in full lines in Figure 6. Since the values $a$, $b$ and $y$ are known, the distance $x$ may be found from the expression $$x = \frac{ab}{y}$$

derived above.

While a specific embodiment of an improved distance measuring instrument has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

A distance measuring instrument comprising a support, an elevating nut rotatably mounted on said support on a vertical axis, a bracket member on said support, a vertically grooved vertical depending shank swivelly secured to said bracket member and threadedly engaged through said elevating nut, defining means to elevate said bracket member predetermined distances relative to said support, a horizontal clamping screw threadedly engaged in said support and engaging in the vertical groove of said shank and preventing rotation of said shank relative to the support, means to lock the bracket member relative to said depending shank, a substantially horizontal telescope supporting bar pivoted to said bracket member for vertical rotation, a sighting telescope pivotally mounted on said supporting bar, means to adjust the telescope angularly relative to said supporting bar, an upwardly projecting vertical elevating screw threadedly engaged with said bracket member and engaging beneath said supporting bar a predetermined horizontal distance from the pivotal axis of said supporting bar on said bracket member, and means for measuring the amount of vertical movement of said elevating screw, whereby the distance to an object may be calculated by determining the difference in height of said elevating screw when the object is sighted through the telescope in two different known elevated positions of said bracket member relative to said support.

References Cited in the file of this patent

UNITED STATES PATENTS

| | | |
|---|---|---|
| 294,014 | Comstock | Feb. 26, 1884 |
| 2,237,443 | Marienthal | Apr. 8, 1941 |
| 2,561,525 | McCauley | July 24, 1951 |

FOREIGN PATENTS

| | | |
|---|---|---|
| 14,727 | Great Britain | June 17, 1897 |